United States Patent
Rhee et al.

(10) Patent No.: US 10,482,656 B2
(45) Date of Patent: Nov. 19, 2019

(54) 3D FACE MODELING METHODS AND APPARATUSES

(71) Applicant: Samsung Electronics Co., Ltd., Suwon-si, Gyeonggi-do (KR)

(72) Inventors: Seon Min Rhee, Seoul (KR); Jungbae Kim, Seoul (KR); Jaejoon Han, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

(21) Appl. No.: 15/344,903

(22) Filed: Nov. 7, 2016

(65) Prior Publication Data
US 2017/0154461 A1    Jun. 1, 2017

(30) Foreign Application Priority Data

Dec. 1, 2015    (KR) .................. 10-2015-0170095

(51) Int. Cl.
*G06T 17/10*    (2006.01)
*G06T 15/04*    (2011.01)

(52) U.S. Cl.
CPC .............. *G06T 17/10* (2013.01); *G06T 15/04* (2013.01)

(58) Field of Classification Search
USPC ........................................ 345/419, 420, 473
See application file for complete search history.

(56) References Cited

U.S. PATENT DOCUMENTS

| | | | |
|---|---|---|---|
| 7,415,152 B2* | 8/2008 | Jiang ................. | G06K 9/00288 345/473 |
| 8,238,642 B2 | 8/2012 | Wu et al. | |
| 8,861,800 B2 | 10/2014 | Savvides et al. | |
| 9,639,737 B2* | 5/2017 | Beeler ................ | G06K 9/00214 |
| 9,652,890 B2* | 5/2017 | Beeler ..................... | G06T 17/20 |
| 2007/0127787 A1* | 6/2007 | Castleman .......... | G06K 9/00248 382/118 |
| 2012/0183238 A1* | 7/2012 | Savvides ............ | G06K 9/00201 382/285 |
| 2013/0127827 A1* | 5/2013 | Shiell .................... | G06T 15/205 345/419 |
| 2013/0201187 A1* | 8/2013 | Tong ...................... | G06T 17/00 345/420 |

(Continued)

FOREIGN PATENT DOCUMENTS

| | | |
|---|---|---|
| JP | 4611575 B2 | 1/2011 |
| KR | 100896643 B1 | 5/2009 |

OTHER PUBLICATIONS

"A morphable model for the synthesis of 3D face," SIGGRAPH '99 Proceedings of the 26th annual conference on Computer graphics and interactive techniques.

*Primary Examiner* — Kimbinh T Nguyen
(74) *Attorney, Agent, or Firm* — Harness, Dickey & Pierce, P.L.C.

(57) ABSTRACT

A three-dimensional (3D) face modeling method and apparatus is disclosed. The 3D face modeling apparatus may generate a personalized 3D face model using a two-dimensional (2D) input image and a generic 3D face model, obtain a depth image and a texture image using the generated personalized 3D face model, determine a patch region of each of the depth image and the texture image, and adjust a shape of the personalized 3D face model based on a matching relationship between the patch region of the depth image and the patch region of the texture image.

18 Claims, 10 Drawing Sheets

(56) References Cited

U.S. PATENT DOCUMENTS

| | | | |
|---|---|---|---|
| 2013/0287294 A1* | 10/2013 | Ye | G06T 15/04 382/154 |
| 2014/0043329 A1* | 2/2014 | Wang | G06T 17/20 345/420 |
| 2014/0229143 A1 | 8/2014 | Cohen-Or et al. | |
| 2015/0070351 A1* | 3/2015 | Tarquini | G06T 13/40 345/419 |
| 2015/0254502 A1* | 9/2015 | Lim | G06T 19/20 700/118 |
| 2016/0148411 A1* | 5/2016 | Chen | G06T 17/10 345/420 |
| 2016/0148427 A1* | 5/2016 | Tena | G06T 17/20 345/419 |
| 2018/0046854 A1* | 2/2018 | Kittler | G06K 9/00201 |

* cited by examiner

FIG. 10

3D FACE MODELING METHODS AND APPARATUSES

CROSS-REFERENCE TO RELATED APPLICATION(S)

This application claims priority under 35 U.S.C. § 119 to Korean Patent Application No. 10-2015-0170095 filed on Dec. 1, 2015, in the Korean Intellectual Property Office, the entire contents of which are incorporated herein by reference in their entirety.

BACKGROUND

1. Field

At least one example embodiment relates to three-dimensional (3D) face modeling method.

2. Description of the Related Art

In general, three-dimensional (3D) face modeling is used in various fields, for example, facial recognition, games, movies, and animations, and provides a higher sense of refinement and reality than two-dimensional (2D) face modeling. The 3D face modeling may include a method of modeling a 3D face of a user based on a 3D coordinate value and a color value obtained for each sample point on a facial surface of the user by using a 3D scanner, and a method of obtaining a 3D face model of a user by extracting a camera parameter and a feature point from a plurality of 2D images obtained by capturing a face of the user and applying the extracted camera parameter and the feature point to a 3D morphable model.

SUMMARY

At least one example embodiment relates to a three-dimensional (3D) face modeling method.

In at least one example embodiment, the method may include generating a personalized 3D face model using a two-dimensional (2D) input image and a generic 3D face model, obtaining a depth image and a texture image using the personalized 3D face model, determining a patch region of the depth image and a patch region of the texture image, and adjusting a shape of the personalized 3D face model based on a relationship between the patch region of the depth image and the patch region of the texture image.

The adjusting may include determining a projection location in the patch region of the depth image, determining a point in the patch region of the texture image corresponding to the projection location, and determining 3D coordinates of the point based on a depth corresponding to the projection location.

The determining of the location of the point may include determining a transformation matrix based on locations of landmarks forming the patch region of the depth image and locations of landmarks forming the patch region of the texture image, and determining the point by applying the determined transformation matrix to the projection location.

The generating of the personalized 3D face model may include detecting facial landmarks in the 2D input image, estimating a parameter to be applied to the generic 3D face model based on locations of the detected facial landmarks, and obtaining the personalized 3D face model by applying the estimated parameter to the generic 3D face model.

At least one example embodiment relates to a 3D face modeling apparatus.

In at least one example embodiment, the apparatus may include at least one memory configured to store instructions; and at least one processor configured to execute the instructions to, generate a personalized 3D face model using a 2D input image and a generic 3D face model, obtain a depth image and a texture image using the personalized 3D face model, determine a patch region of the depth image and a patch region of the texture image, and adjust a shape of the personalized 3D face model based on a relationship between the patch region of the depth image and the patch region of the texture image.

The adjusting of the shape of the personalized 3D face model may include determining a projection location in the patch region of the depth image, determining a point in the patch region of the texture image corresponding to the projection location, and determining 3D coordinates of the point based on a depth corresponding to the projection location.

Additional aspects of example embodiments will be set forth in part in the description which follows and in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
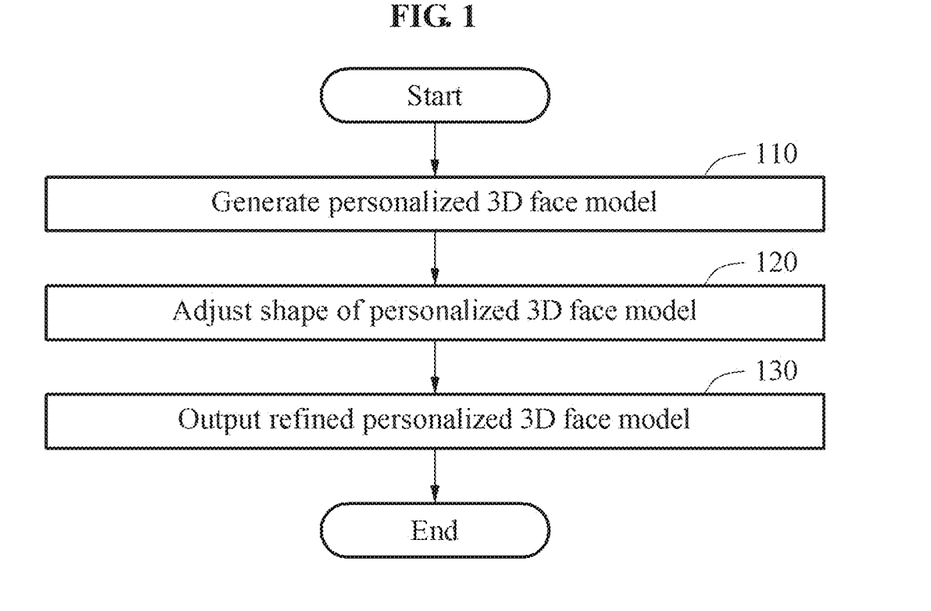
FIG. 1 is a flowchart illustrating a three-dimensional (3D) face modeling method according to at least one example embodiment.

FIG. 1 is a flowchart illustrating a three-dimensional (3D) face modeling method according to at least one example embodiment. The 3D face modeling method may be performed by a 3D face modeling apparatus, for example, a 3D face modeling apparatus 900 illustrated in FIG. 9 and a 3D face modeling apparatus 1000 illustrated in FIG. 10.

Referring to FIG. 1, in operation 110, the 3D face modeling apparatus generates a personalized 3D face model that three-dimensionally models a facial shape of a user from at least one two-dimensional (2D) input image. The 3D face modeling apparatus may generate the personalized 3D face model by extracting features associated with the facial shape from the 2D input image and applying the extracted features to a generic 3D face model. The generic 3D face model is a deformable and statistical 3D face model of which a facial shape is determined by a parameter. According to at least one example, the 3D face modeling apparatus may generate the personalized 3D face model that globally fits the facial shape of the user by detecting facial landmarks in the 2D input image, and controlling a parameter be applied to the generic 3D face model based on locations of the detected facial landmarks.

A detailed process of generating a personalized 3D face model by the 3D face modeling apparatus will be described with reference to FIG. 2.

In operation 120, the 3D face modeling apparatus adjusts a shape of the personalized 3D face model. The 3D face modeling apparatus may refine the personalized 3D face model to increase a degree of matching between a location of a vertex of the personalized 3D face model and a texture of the 2D input image. The 3D face modeling apparatus may refine the personalized 3D face model to match locations of vertices of the personalized 3D face model to the texture of the 2D input image. For the matching, the 3D face modeling apparatus may generate a depth image and a texture image using the personalized 3D face model, and adjust the locations of the vertices of the personalized 3D face model based on a patch region.

When generating the personalized 3D face model using the generic 3D face model, an overall shape of the personalized 3D face model may be estimated based on the facial landmarks detected in the 2D input image, as described in operation 110. However, a local difference may be present between the texture of the 2D input image and the shape of the personalized 3D face model generated in operation 110. The 3D face modeling apparatus may generate a more refined personalized 3D face model that is more similar to the facial shape of the user by adjusting the shape of the personalized 3D face model based on the texture of the 2D input image.

A detailed process of refining a shape of a personalized 3D face model by the 3D face modeling apparatus will be described with reference to FIG. 3.

At 130, the 3D face modeling apparatus outputs (e.g., displays) the refined personalized 3D face model for use in facial recognition, games, movies, and animations, and provides a higher sense of refinement and reality than two-dimensional (2D) face modeling, for example.

Figure 2:
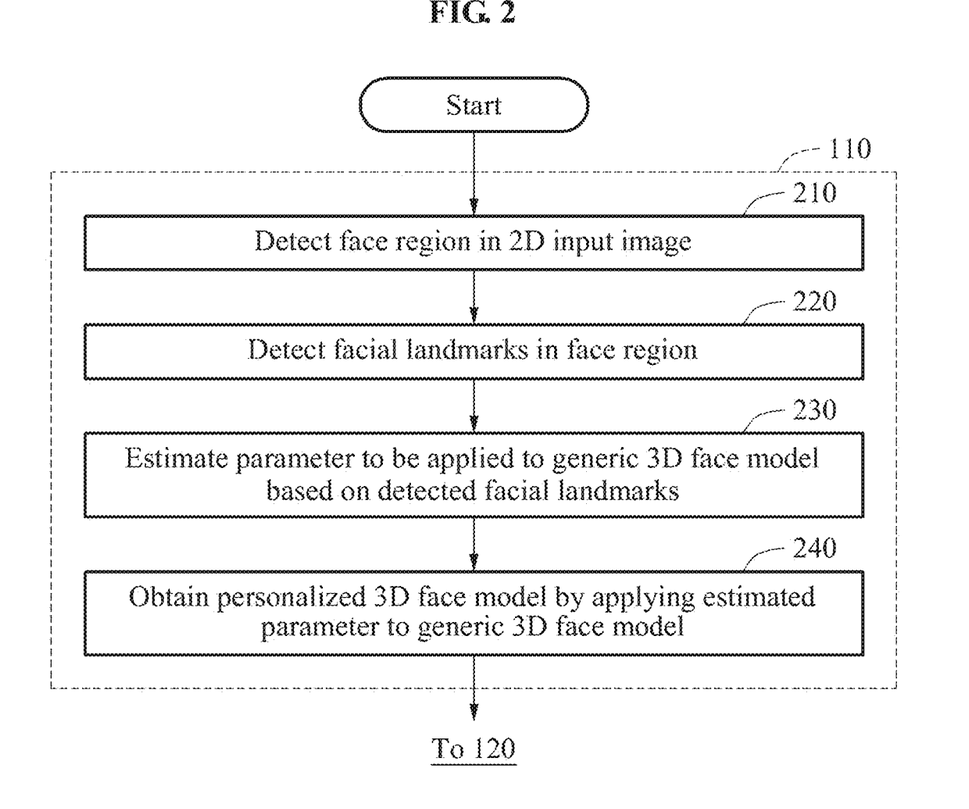
FIG. 2 is a flowchart illustrating a process of generating a personalized 3D face model according to at least one example embodiment.

FIG. 2 is a flowchart illustrating a detailed process of performing operation 110 of generating a personalized 3D face model described with reference to FIG. 1.

Referring to FIG. 2, in operation 210, the 3D face modeling apparatus detects a face region in a 2D input image. For example, the 3D face modeling apparatus may detect the face region in the 2D input image using a Haar-based cascade adaboost classifier. However, a scope of example embodiments is not limited to such a particular example, and thus the 3D face modeling apparatus may detect the face region in the 2D input image using various methods of detecting a face region.

In operation 220, the 3D face modeling apparatus detects facial landmarks in the face region. For example, the 3D face modeling apparatus may detect such landmarks in the 2D input image using a landmark detecting method based on, for example, an active contour model (ACM), active shape model (ASM), an active appearance model (AAM), a supervised descent method (SDM), and deep learning. The facial landmarks indicate main features of a face, and feature points located in eyebrows, eyes, a nose, lips, a chin, ears, a facial contour, and the like.

In operation 230, the 3D face modeling apparatus estimates at least one parameter to be applied to a generic 3D face model based on the facial landmarks detected in operation 220. A shape of a personalized 3D face model may be determined by adjusting the at least one parameter to be applied to the generic 3D face model. For example, the personalized 3D face model may be determined based on Equation 1 below.

$$S = \bar{S} + \Sigma \tau_i V_i \qquad \text{Equation 1}$$

In Equation 1, "$\bar{S}$" denotes shape elements indicating a mean shape of a generic 3D face model, "$V_i$" and "$\tau_i$" denote control parameters that may represent a variation in a facial shape of each user. In detail, "$V_i$" denotes a control parameter to determine a variation direction of the generic 3D face model, and as an eigenvector value. "$\tau_i$" denotes a control parameter to determine a variation degree of the generic 3D face model, and has an eigenvalue. A subscript "i" in each of $V_i$ and $\tau_i$ denotes an index to identify a vertex of a shape of the generic 3D face model to which $V_i$ and $\tau_i$ are applied. A shape variation of the generic 3D face model may be determined based on a weighted sum of $V_i$ and $\tau_i$. "S" indicates shape elements of a personalized 3D face model determined by applying the shape variation based on the control parameters $V_i$ and $\tau_i$ to e mean shape S of the generic 3D face model.

The 3D face modeling apparatus may determine a control parameter $\tau_i$ that may express most desirably a facial shape of a user based on locations of the landmarks detected in the 2D input image. For example, the 3D face modeling apparatus may determine the control parameter $\tau_i$ based on Equation 2 below.

$$\tau = \operatorname*{argmin}_{\tau=(\tau_1,\ldots,\tau_n)} \sum_{k=1}^{m} \left\| Y_{2D,k} - P_k\left(\overline{S} + \sum \tau_i V_i\right) \right\|^2 \quad \text{[Equation 2]}$$

in Equation 2, "$Y_{2D,k}$" denotes al cation of a landmark detected in a k-th 2D input image, and "m" denotes a total number of 2D input images. "$P_k$" denotes a matrix to rotate and move the generic 3D face model based on a facial pose estimated from the k-th 2D input image and project, onto a 2D plane, the generic 3D face model rotated and moved based on the estimated facial pose. "$\overline{S}$" denotes shape elements indicating a mean shape of the generic 3D face model. "$\tau$" denotes a control parameter to determine a variation degree of the generic 3D face model, and "V" denotes a control parameter to determine a variation direction of the generic 3D face model. "n" denotes the number of vertices forming the generic 3D face model.

When landmarks of a 3D face model generated based on a control parameter $\tau_i$ are projected to a 2D input image, Equation 2 indicates a determination of a control parameter $\tau_i$ that minimizes a difference between locations of landmarks detected in the 2D input image and locations of the projected landmarks.

In operation 240, the 3D face modeling apparatus obtains the personalized 3D face model by applying the estimated at least one parameter to the generic 3D face model. The 3D face modeling apparatus may obtain the personalized 3D face model by applying the control parameter $\tau_i$ determined in operation 230 to Equation 1.

Figure 3:
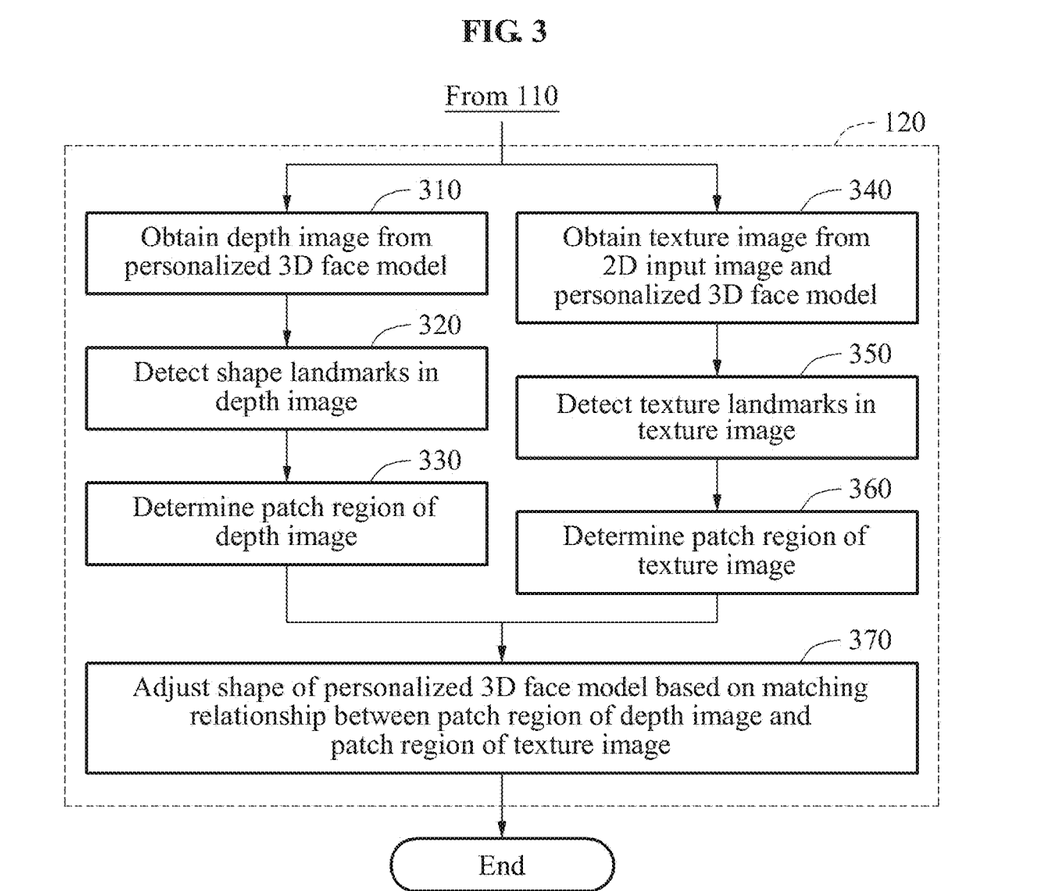
FIG. 3 is a flowchart illustrating a process of adjusting a shape of a personalized 3D face model according to at least one example embodiment.

FIG. 3 is a flowchart illustrating a detailed process of performing operation 120 of adjusting a shape of a personalized 3D face model described with reference to FIG. 1.

Referring to FIG. 3, in operation 310, the 3D face modeling apparatus obtains a depth image from a personalized 3D face model. According to at least one example, the 3D face modeling apparatus may generate the depth image by projecting, onto a 2D plane, a depth value of a facial shape of the personalized 3D face model. The 3D face modeling apparatus may adjust a facial pose of the personalized 3D face model before generating the depth image. For example, the 3D face modeling apparatus may adjust the facial pose of the personalized 3D face model to be a front facial pose or to be identical to a facial pose appearing in a 2D input image.

In operation 320, the 3D face modeling apparatus detects shape landmarks in the depth image. The shape landmarks refer to facial landmarks detected in the depth image. The 3D face modeling apparatus may determine locations of the shape landmarks by projecting, to the depth image, locations of landmarks defined in the personalized 3D face model. The locations of the landmarks defined in the personalized 3D face model may correspond to locations of vertices in main feature regions of a face, for example, eyes, eyebrows, a nose, lips, and a chin, among vertices forming the personalized 3D face model.

In operation 330, the 3D face modeling apparatus determines a patch region of the depth image based on the shape landmarks. For example, the 3D face modeling apparatus may determine the patch region in a shape of a triangle mesh based on the shape landmarks as reference points in the depth image. Here, the 3D face modeling apparatus may determine the patch region using a method, for example, Delaunay triangulation.

In operation 340, the 3D face modeling apparatus obtains a texture image from the 2D input image and the personalized 3D face model. According to at least one example, the 3D face modeling apparatus may generate a 3D texture face model by mapping the 2D input image used as a texture to the personalized 3D face model, and obtain the texture image by projecting the generated 3D texture face model onto a 2D plane. The 3D face modeling apparatus may adjust a facial pose of the 3D texture face model to be identical to the facial pose appearing in the 2D input image before projecting the 3D texture face model onto the 2D plane. The 3D texture face model indicates the personalized 3D face model having texture information of the 2D input image.

In operation 350, the 3D face modeling apparatus detects texture landmarks in the texture image. The texture landmarks refer to facial landmarks detected in the texture image. The 3D face modeling apparatus may determine locations of the texture landmarks based on locations of landmarks detected in the 2D input image, or detect the texture landmarks in the texture image using a landmark detecting method described in operation 220 of FIG. 2.

In operation 360, the 3D face modeling apparatus determines a patch region of the texture image based on the texture landmarks. For example, the 3D face modeling apparatus may determine the patch region in a shape of a triangle mesh based on the texture landmarks as reference points in the texture image. Here, the 3D face modeling apparatus may determine the patch region using a method, for example, Delaunay triangulation.

In operation 370, the 3D face modeling apparatus adjusts a shape of the personalized 3D face model based on a matching relationship between the patch region of the depth image and the patch region of the texture image. The patch region of the depth image and the patch region of the texture image may correspond to each other. The 3D face modeling apparatus may correct locations of vertices forming the personalized 3D face model in a unit of a patch region.

The 3D face modeling apparatus may determine a projection location at which a vertex of the personalized 3D face model is projected to the patch region of the depth image, and determine a location of a point in the patch region of the texture image corresponding to the projection location. For example, the location of the point may be determined using a matrix to be defined by an affine transformation between the shape landmarks forming the patch region of the depth image and the texture landmarks forming the patch region of the texture image.

The 3D face modeling apparatus may determine a depth corresponding to the projection location based on a normal direction towards a location of a vertex to be adjusted from a plane in a 3D space corresponding to the patch region of the depth image. Subsequently, the 3D face modeling apparatus may determine 3D coordinates of the point corresponding to the projection location based on the determined depth and a normal direction of a plane in a 3D space corresponding to the patch region of the texture image. The 3D face modeling apparatus may determine, to be the 3D coordinates of the point, a location of the point moved by the depth in the normal direction of the plane in the 3D space corresponding to the patch region of the texture image. The 3D face modeling apparatus may adjust the location of the vertex based on the determined 3D coordinates of the point, and thus the shape of the personalized 3D face model may locally match the texture of the 2D input image.

Figure 4:
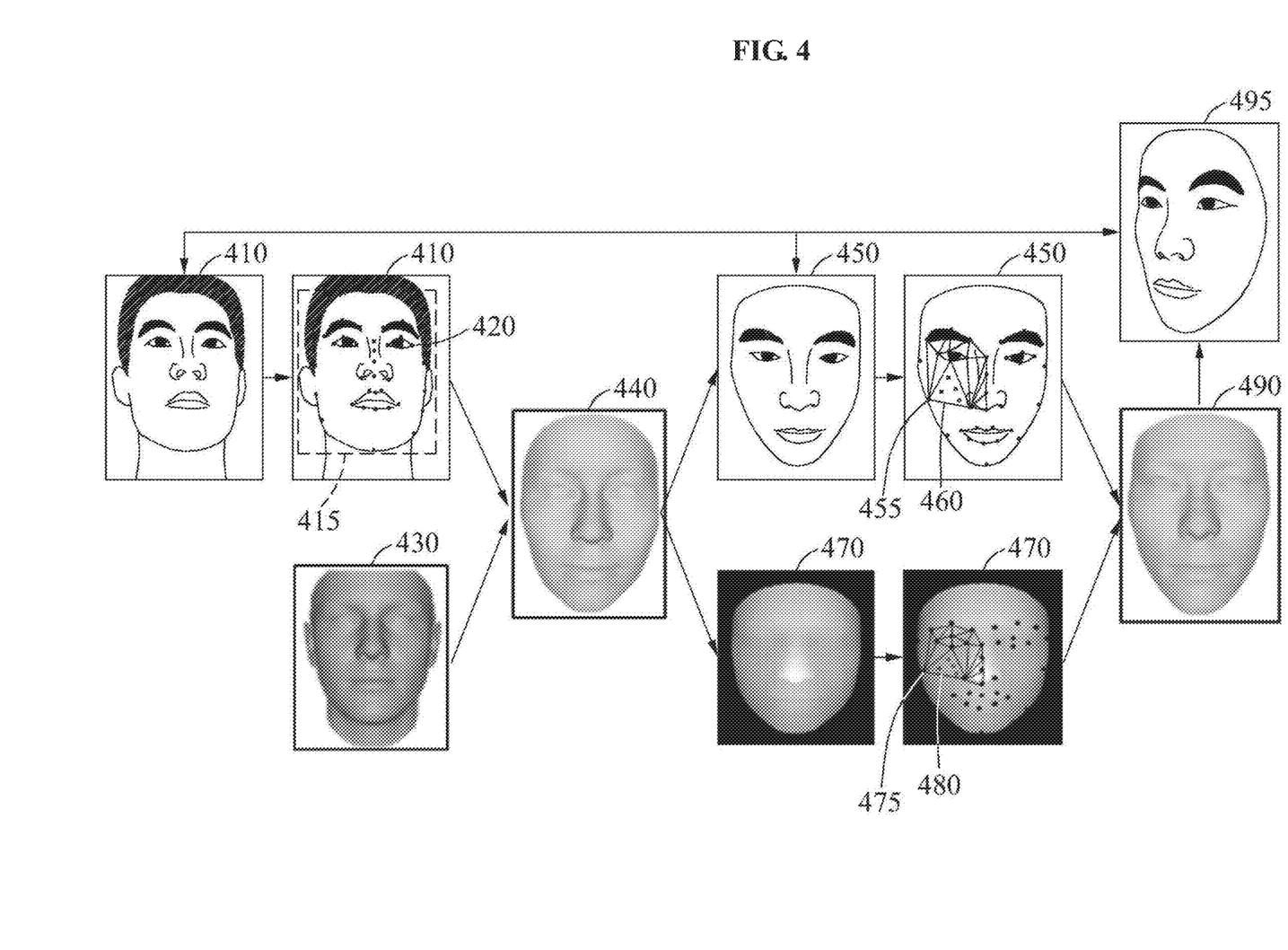
FIGS. 4 through 8 illustrate a process of generating a personalized 3D face model from a two-dimensional (2D) input image and refining the generated 3D face model according to at least one example embodiment.

FIG. 4 illustrates an overall flow of a process of generating a personalized 3D face model from a 2D input image and refining the personalized 3D face model according to at least one example embodiment.

Referring to FIG. 4, a 3D face modeling apparatus detects a face region 415 in a 2D input image 410, and detects landmarks 420 located in main feature regions in the face region 415. The 3D face modeling apparatus obtains a personalized 3D face model 440 that models a global shape of a face of a user by transforming a shape of a generic 3D face model 430 based on locations of the landmarks 420.

According to at least one example, the 3D face modeling apparatus adjusts a pose of the personalized 3D face model 440, and obtains a depth image 470 and a texture image 450 using the personalized 3D face model 440. The 3D face modeling apparatus generates the depth image 470 by, for example, projecting a depth value of the personalized 3D face model 440 onto a 2D plane. The 3D face modeling apparatus obtains the texture image 450 by mapping a texture of the 2D input image 410 to the personalized 3D face model 440 and projecting, onto a 2D plane, the personalized 3D face model to which the texture is mapped.

Subsequently, the 3D face modeling apparatus detects shape landmarks 475 in the depth image 470, and determines patch regions 480 based on the shape landmarks 475. The 3D face modeling apparatus detects texture landmarks 455 in the texture image 450, and determines patch regions 460 based on the texture landmarks 455. Each of the patch regions 480 of the depth image 470 and each of the patch regions 460 of the texture image 450 may correspond to each other, respectively.

The 3D face modeling apparatus refines a shape of the personalized 3D face model 440 based on a matching relationship between the patch regions 480 of the depth image 470 and the patch regions 460 of the texture image 450. The 3D face modeling apparatus adjusts locations of vertices forming the personalized 3D face model 440 to match the shape of the personalized 3D face model 440 to a texture of the texture image 450. Through such a refining process described in the foregoing, a refined personalized 3D face model 490 is obtained. In comparison to the personalized 3D face model 440, the refined personalized 3D face model 490 may reflect more suitably a local shape and feature of the face of the user. The 3D face modeling apparatus may also generate a 3D texture face model 495 by mapping a texture extracted from the 2D input image 410 to the refined personalized 3D face model 490.

Figure 5:
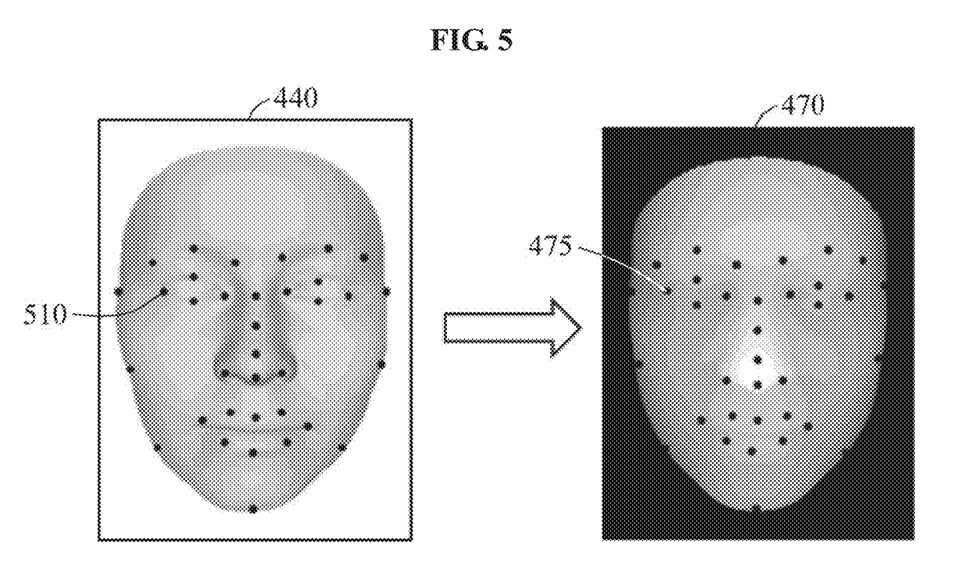

FIG. 5 illustrates a process of determining shape landmarks in a depth image according to at least one example embodiment. Referring to FIG. 5, a 3D face modeling apparatus determines shape landmarks 475 by projecting, to a depth image 470, locations of landmarks 510 pre-defined in a personalized 3D face model 440. The locations of the landmarks 510 may correspond to respective locations of vertices in main feature regions of a face among vertices of the personalized 3D face model 440.

Figure 6:
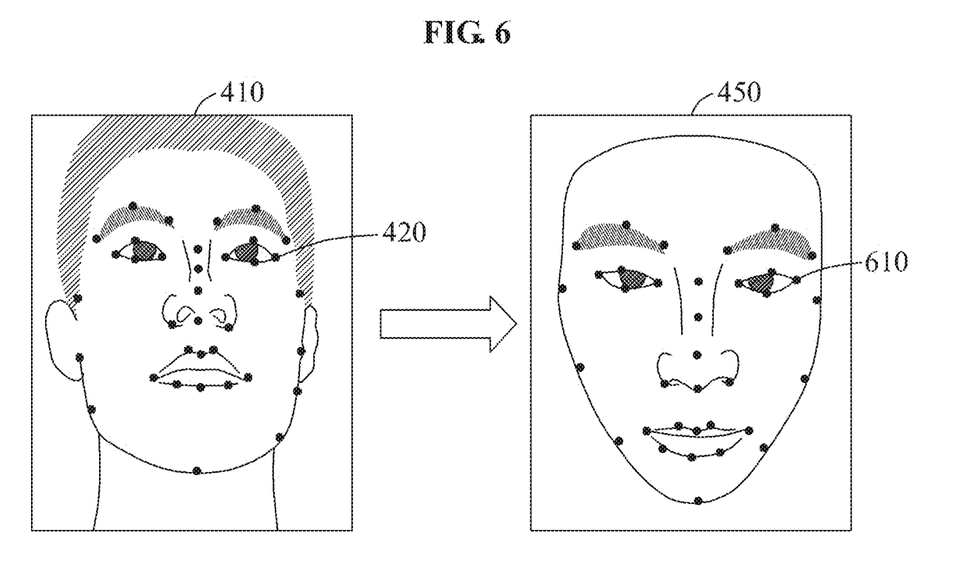

FIG. 6 illustrates a process of determining texture landmarks in a texture image according to at least one example embodiment. Referring to FIG. 6, a 3D face modeling apparatus obtains a texture image 450 by mapping a texture extracted from a 2D input image 410 to a personalized 3D face model 440 and projecting, onto a 2D plane, the personalized 3D face model to which the texture is mapped. The 3D face modeling apparatus determines locations of texture landmarks 610 based on locations of landmarks 420 detected in the 2D input image 410 or detects the texture landmarks 610 using a landmark detecting method based on, for example, an ACM, an ASM, an AAM, an SDM, and deep learning.

Figure 7:
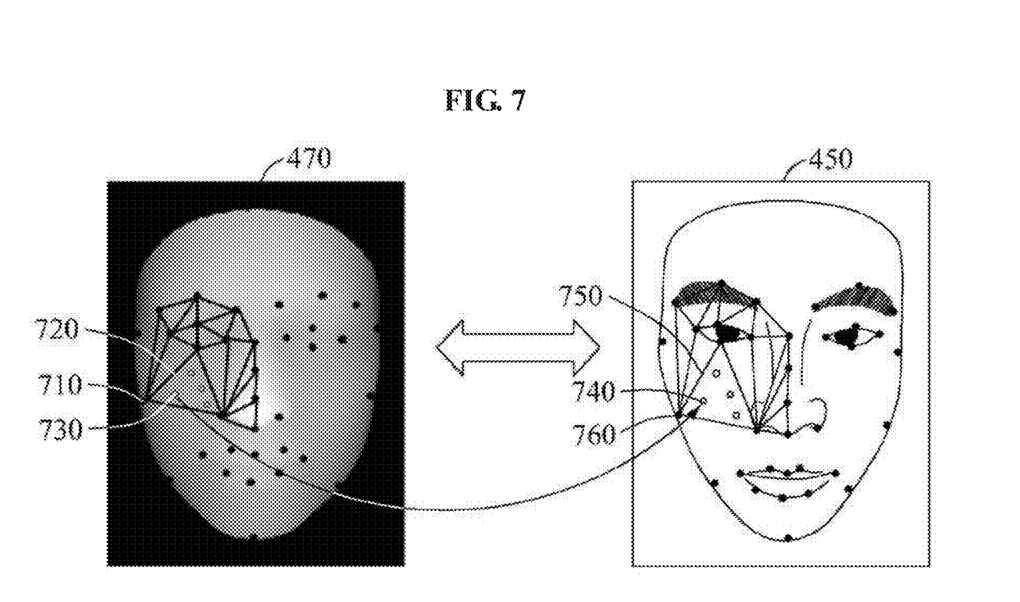

FIG. 7 illustrates a patch region of a depth image and a patch region of a texture image according to at least one example embodiment. Referring to FIG. 7, a 3D face modeling apparatus determines a patch region 720 based on shape landmarks 710 detected in a depth image 470. For example, the 3D face modeling apparatus may determine, to be the patch region 720, a triangle mesh having the shape landmarks 710 as three vertices. The 3D face modeling apparatus determines a projection location 730 by projecting, to the depth image 470, vertices that are not the shape landmarks 710 among vertices of a personalized 3D face model 440.

The 3D face modeling apparatus determines a patch region 750 based on texture landmarks 760 detected in a texture image 450. For example, the 3D face modeling apparatus may determine, to be the patch region 750, a triangle mesh having the texture landmarks 760 as three vertices. The 3D face modeling apparatus determines a location of a point 740 in the texture image 450 corresponding to the projection location 730 in the depth image 470. For example, the 3D face modeling apparatus may calculate a matrix defined by an affine transformation between the shape landmarks 710 forming the patch region 720 and the texture landmarks 760 forming the patch region 750, and determine the location of the point 740 by applying the projection location 730 to the calculated matrix. The 3D face modeling apparatus may perform the process described in the foregoing on each vertex forming the personalized 3D face model 440, and determine a projection location at which each vertex of the personalized 3D face model 440 is projected to the depth image 470 and a location of a point in the texture image 450 corresponding to the projection location.

Figure 8:
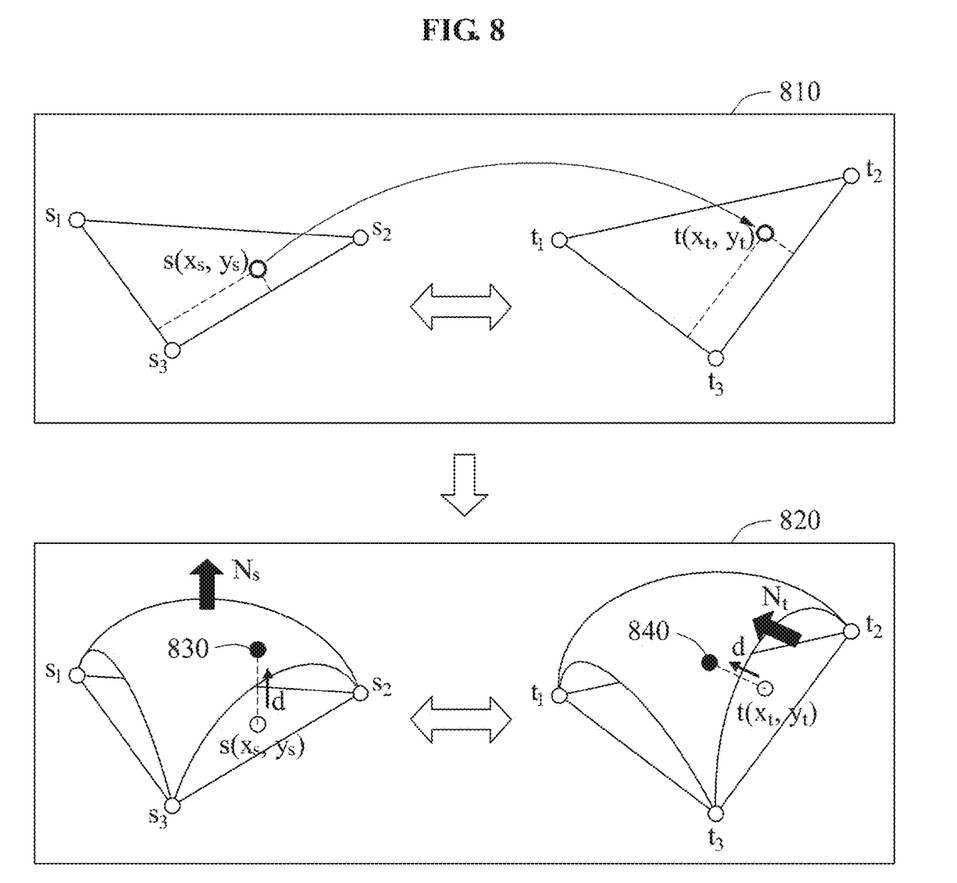

FIG. 8 is a diagram illustrating a process of adjusting a shape of a personalized 3D face model based on a matching relationship between a patch region of a depth image and a patch region of a texture image according to at least one example embodiment.

Referring to FIG. 8, in operation 810, a 3D face modeling apparatus determines a location of a point t(xt, yt) in a patch region of a texture image corresponding to a projection location s(xs, ys) at which a current vertex of a personalized 3D face model is projected to a patch region of a depth image. According to at least one example, the 3D face modeling apparatus may determine an affine transformation matrix based on a relationship between locations of three shape landmarks s1, s2, and s3 forming the patch region of the depth image and locations of three texture landmarks t1, t2, and t3 forming the patch region of the texture image, and determine the location of the point t(xt, yt) by applying the projection location s(xs, ys) to the determined affine transformation matrix. Here, respective depths of the texture landmarks t1, t2, and t3 may correspond to respective depths of the shape landmarks s1, s2, and s3.

In operation 820, the 3D face modeling apparatus determines 3D coordinates 840 of the point t(xt, yt) based on a depth d from the projection point s(xs, ys) of a current vertex 830. The 3D face modeling apparatus determines the depth d from the projection point s(xs, ys) based on a no al direction Ns towards a location of the current vertex 830 from a plane in a 3D space corresponding to the patch region formed by the shape landmarks s1, s2, and s3. The depth d may correspond to a distance between the projection location s(xs, ys) and the location of the current vertex 830. The normal direction Ns may be determined based on a plane equation associated with the patch region formed by the shape landmarks s1, s2, and s3. The 3D face modeling apparatus may determine a depth of the point t(xt, yt) moved by the depth d in a normal direction Nt of a plane in a 3D space corresponding to the patch region formed by the texture landmarks t1, t2, and t3, and determine the 3D coordinates 840 of the point t(xt, yt). The normal direction Nt may be determined based on a plane equation associated with the patch region formed by the texture landmarks t1, t2, and t3. The 3D face modeling apparatus may determine the 3D coordinates 840 to be a location value of the current vertex 830.

Figure 9:
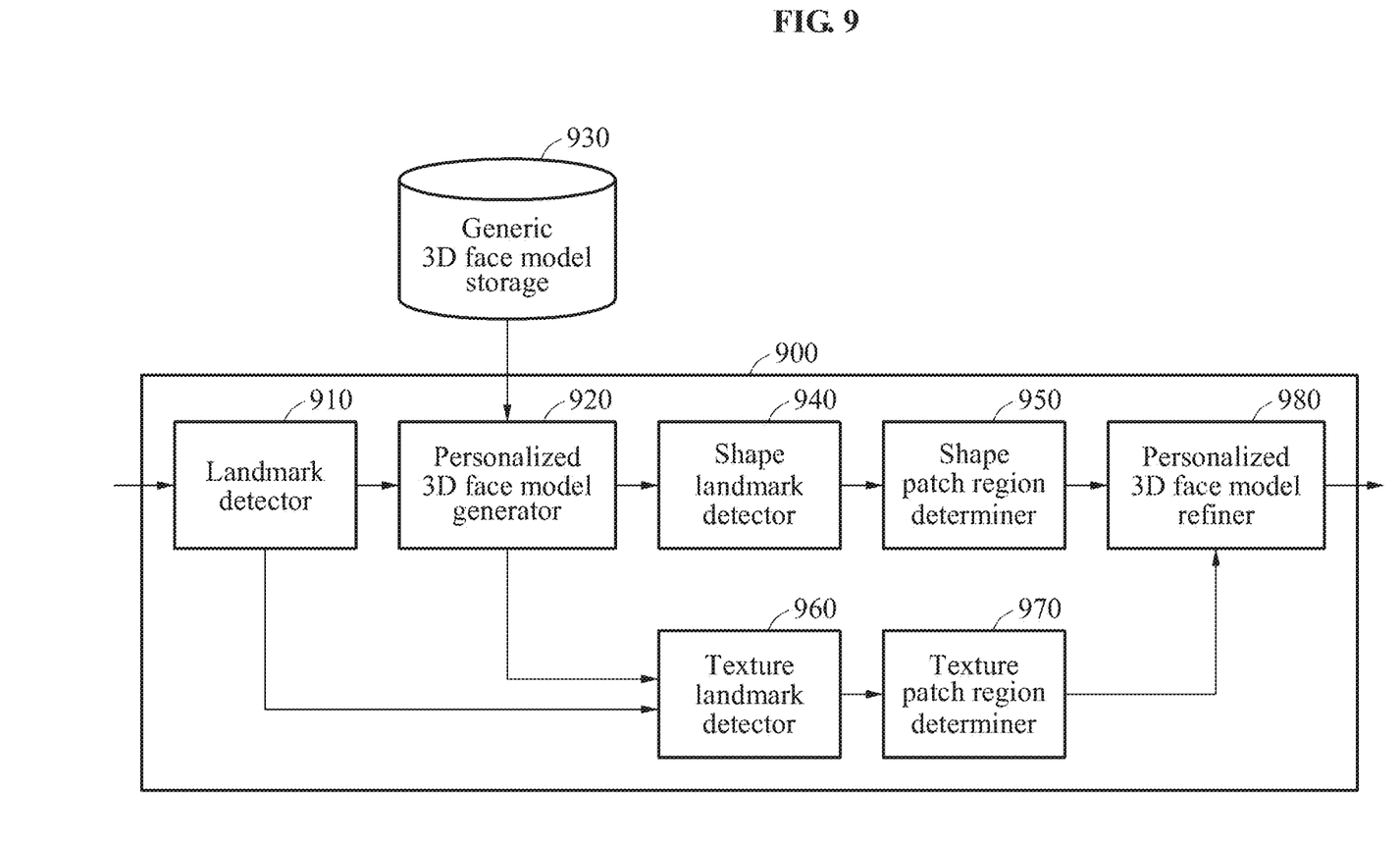
FIG. 9 is a diagram illustrating an example of a 3D face modeling apparatus according to at least one example embodiment.

FIG. 9 is a diagram illustrating an example of a 3D face modeling apparatus 900 according to at least one example embodiment.

Referring to FIG. 9, the 3D face modeling apparatus 900 includes a landmark detector 910, a personalized 3D face model generator 920, a shape landmark detector 940, a shape patch region determiner 950, a texture landmark detector 960, a texture patch region determiner 970, and a personalized 3D face model refiner 980.

The landmark detector 910 detects a face region in a 2D input image, and detects facial landmarks in the detected face region. The personalized 3D face model generator 920 generates a personalized 3D face model using the detected facial landmarks and a generic 3D face model stored in a generic 3D face model storage 930. The personalized 3D face model generator 920 estimates a parameter to determine a variation in a shape of the generic 3D face model based on locations of the landmarks detected in the 2D input image, and generates the personalized 3D face model by applying the estimated parameter to the generic 3D face model. According to at least one example, the generic 3D face model storage 930 may be present outside the 3D face modeling apparatus 900 or included in the 3D face modeling apparatus 900.

The personalized 3D face model generator 920 generates a depth image and a texture image using the personalized 3D face model. The depth image is transferred to the shape landmark detector 940, and the shape landmark detector 940 detects shape landmarks in the depth image. The texture image is transferred to the texture landmark detector 960, and the texture landmark detector 960 detects texture landmarks in the texture image.

The shape patch region determiner 950 determines a patch region, for example, a triangle mesh, based on the shape landmarks in the depth image. The texture patch region determiner 970 determines a patch region, for example, a triangle mesh, based on the texture landmarks in the texture image. Each patch region determined in the depth image may correspond to each patch region determined in the texture image.

The personalized 3D face model refiner 980 refines a shape of the personalized 3D face model. The personalized 3D face model refiner 980 adjusts a local shape of the personalized 3D face model to match a texture of the 2D input image. The personalized 3D face model refiner 980 adjusts 3D coordinate values of vertices forming the personalized 3D face model based on a matching relationship between the patch region of the depth image and the patch region of the texture image.

For respective operations of the aforementioned components of the 3D face modeling apparatus 900, reference may be made to the descriptions provided with reference to FIGS. 1 through 8, and thus a more detailed description will be omitted here for brevity.

Figure 10:
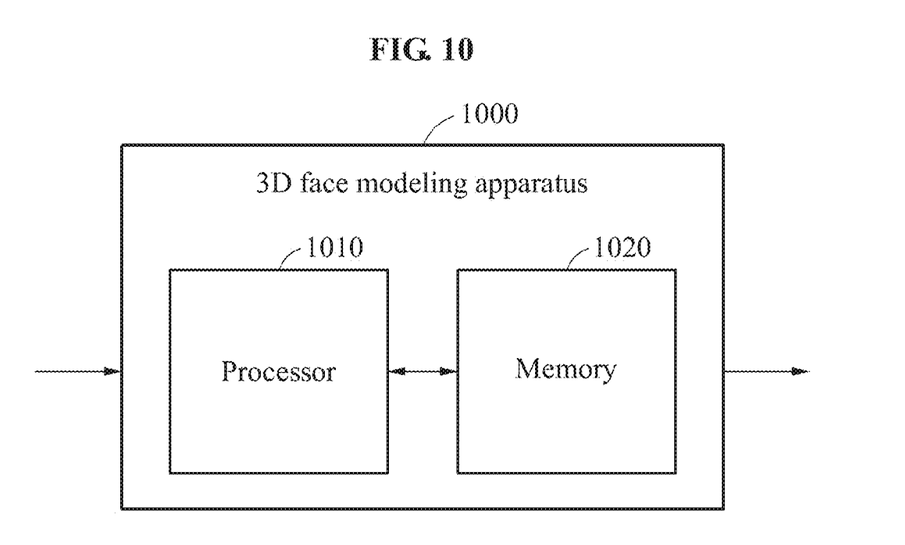
FIG. 10 is a diagram illustrating another example of a 3D face modeling apparatus according to at least one example embodiment.

FIG. 10 is a diagram illustrating another example of a 3D face modeling apparatus 1000 according to at least one example embodiment.

Referring to FIG. 10, the 3D face modeling apparatus 1000 includes at least one processor 1010 and at least one memory 1020.

The processor 1010 performs the operations described with reference to FIGS. 1 through 9 by executing computer-readable instructions stored on the memory 1020. For example, the processor 1010 may generate a personalized 3D face model using a 2D input image and a generic 3D face model, and obtain a depth image and a texture image using the personalized 3D face model. The processor 1010 may determine a patch region based on a landmark detected in each of the depth image and the texture image, and refine a shape of the personalized 3D face model based on a matching relationship between the patch region of the depth image and the patch region of the texture image. The processor 1010 may be configured as an array of logic gates, or another type of hardware as understood by a person having ordinary skill in the art. In addition, the processor 1010 may include at least one graphics processing unit (GPU) to perform 3D face modeling.

The memory 1020 stores the instructions to perform the operations described with reference to FIGS. 1 through 9, or stores data and results obtained while the 3D face modeling apparatus 1000 is operating. In some example, the memory 1020 may include a non-transitory computer-readable medium, for example, a high-speed random access memory and/or a nonvolatile computer-readable medium (e.g. at least one disk storage device, flash memory device, and other nonvolatile solid-state memory device).

The units and/or modules described herein (e.g., the landmark detector 910, the personalized 3D face model generator 920, the shape landmark detector 940, the shape patch region determiner 950, the texture landmark detector 960, the texture patch region determiner 970 and the personalized 3D face model refiner 980) may be implemented using hardware components and/or hardware executing software components. For example, the hardware components may include microphones, amplifiers, band-pass filters, audio to digital convertors, and processing devices. A processing device may be implemented using one or more hardware device configured to carry out and/or cute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A three-dimensional (3D) face modeling method, comprising:
generating a personalized 3D face model using a two-dimensional (2D) input image and a generic 3D face model;
obtaining a depth image and a texture image using the personalized 3D face model;
determining a patch region of the depth image and a patch region of the texture image; and
adjusting a shape of the personalized 3D face model based on a relationship between the patch region of the depth image and the patch region of the texture image,
wherein the obtaining includes,
obtaining the depth image by projecting, onto a 2D plane, a depth value of the personalized 3D face model, and
obtaining the texture image by projecting, onto a 2D plane, a 3D texture face model generated by mapping a texture of the 2D input image to the personalized 3D face model,
wherein the adjusting includes,
determining a projection location at which a current vertex of the personalized 3D face model is projected to the patch region of the depth image;
determining a point in the patch region of the texture image corresponding to the projection location,
determining 3D coordinates of the point based on a depth corresponding to the projection location and a normal direction corresponding to the patch region of the texture image, and
adjusting the shape of the personalized 3D face model based on the determined 3D coordinates of the point.

2. The method of claim 1, wherein the determining of the point comprises:
determining a transformation matrix based on locations of landmarks forming the patch region of the depth image and locations of landmarks forming the patch region of the texture image; and
determining the point by applying the determined transformation matrix to the projection location.

3. The method of claim 1, wherein the depth corresponding to the projection location is based on a normal direction towards a current vertex of the personalized 3D face model, the projection location being a location at which the current vertex is projected to the patch region of the depth image.

4. The method of claim 1, wherein the determining of the 3D coordinates of the point comprises:
determining a location of the point as the 3D coordinates, the location being moved by the depth corresponding to the projection location in a normal direction of a plane in a 3D space corresponding to the patch region of the texture image.

5. The method of claim 1, wherein the determining of the patch region of the texture image comprises:
detecting facial landmarks in the texture image; and
determining the patch region of the texture image based on the facial landmarks detected in the texture image.

6. The method of claim 1, wherein the determining of the patch region of the depth image comprises:
detecting first landmarks in the depth image based on locations in the depth image, second landmarks in the personalized 3D face model are projected to the locations; and
determining the patch region of the depth image based on the first landmarks detected in the depth image.

7. The method of claim 1, wherein the generating of the personalized 3D face model comprises:
detecting facial landmarks in the 2D input image;
estimating a parameter to be applied to the generic 3D face model based on locations of the facial landmarks; and
obtaining the personalized 3D face model by applying the estimated parameter to the generic 3D face model.

8. The method of claim 1, wherein the obtaining of the depth image comprises:
obtaining the depth image based on a depth value of a facial shape of the personalized 3D face model.

9. The method of claim 1, wherein the obtaining of the texture image comprises:
projecting the personalized 3D face model to which the texture is mapped onto a 2D plane.

10. A non-transitory computer-readable medium comprising program code that, when executed by a processor, causes the processor to perform the method of claim 1.

11. The method of claim 1, further comprising:
outputting the adjusted personalized 3D face model.

12. The method of claim 1, wherein the projection location and the point in the patch region of the texture image have different coordinates.

13. The method of claim 12, wherein the point in the patch region has 2D coordinates and the determining the 3D coordinates includes applying the depth to the 2D coordinates to determine the 3D coordinates.

14. The method of claim 1, wherein the determining the point in the patch region of the texture image corresponding to the projection location determines the point in the patch region of the texture image corresponding to the projection location using an affine transformation.

15. A three-dimensional (3D) face modeling apparatus, comprising:
at least one memory configured to store instructions; and
at least one processor configured to execute the instructions to cause the apparatus to,
generate a personalized 3D face model using a two-dimensional (2D) input image and a generic 3D face model;
obtain a depth image and a texture image using the generated personalized 3D face model;
determine a patch region of the depth image and a patch region of the texture image; and
adjust a shape of the personalized 3D face model based on a matching relationship between the patch region of the depth image and the patch region of the texture image,
wherein the processor is configured to execute the instructions to cause the apparatus to,
obtain the depth image by projecting, onto a 2D plane, a depth value of the personalized 3D face model, and
obtain the texture image by projecting, onto a 2D plane, a 3D texture face model generated by mapping a texture of the 2D input image to the personalized 3D face model,
determine a projection location at which a current vertex of the personalized 3D face model is projected to the patch region of the depth image;
determine a point in the patch region of the texture image corresponding to the projection location,
determine 3D coordinates of the point based on a depth corresponding to the projection location and a normal direction corresponding to the patch region of the texture image, and
adjust the shape of the personalized 3D face model based on the determined 3D coordinates of the point.

16. The apparatus of claim 15, wherein the processor is configured to execute the instructions to cause the apparatus to,
determine a location of the point as the 3D coordinates, the location being moved by the depth corresponding to the projection location in a normal direction of the patch region of the texture image.

17. The apparatus of claim 15, wherein the patch region of the texture image is based on facial landmarks detected in the texture image, and the patch region of the depth image is based on facial landmarks defined in the personalized 3D face model.

18. The method of claim 14, wherein the affine transformation represents a transformation between the patch region of the depth image and the patch region of the texture image.

* * * * *